Jan. 23, 1968     B. H. BURTT     3,365,231
SNUBBING DEVICE FOR A TILTABLE SEAT
Filed March 18, 1966
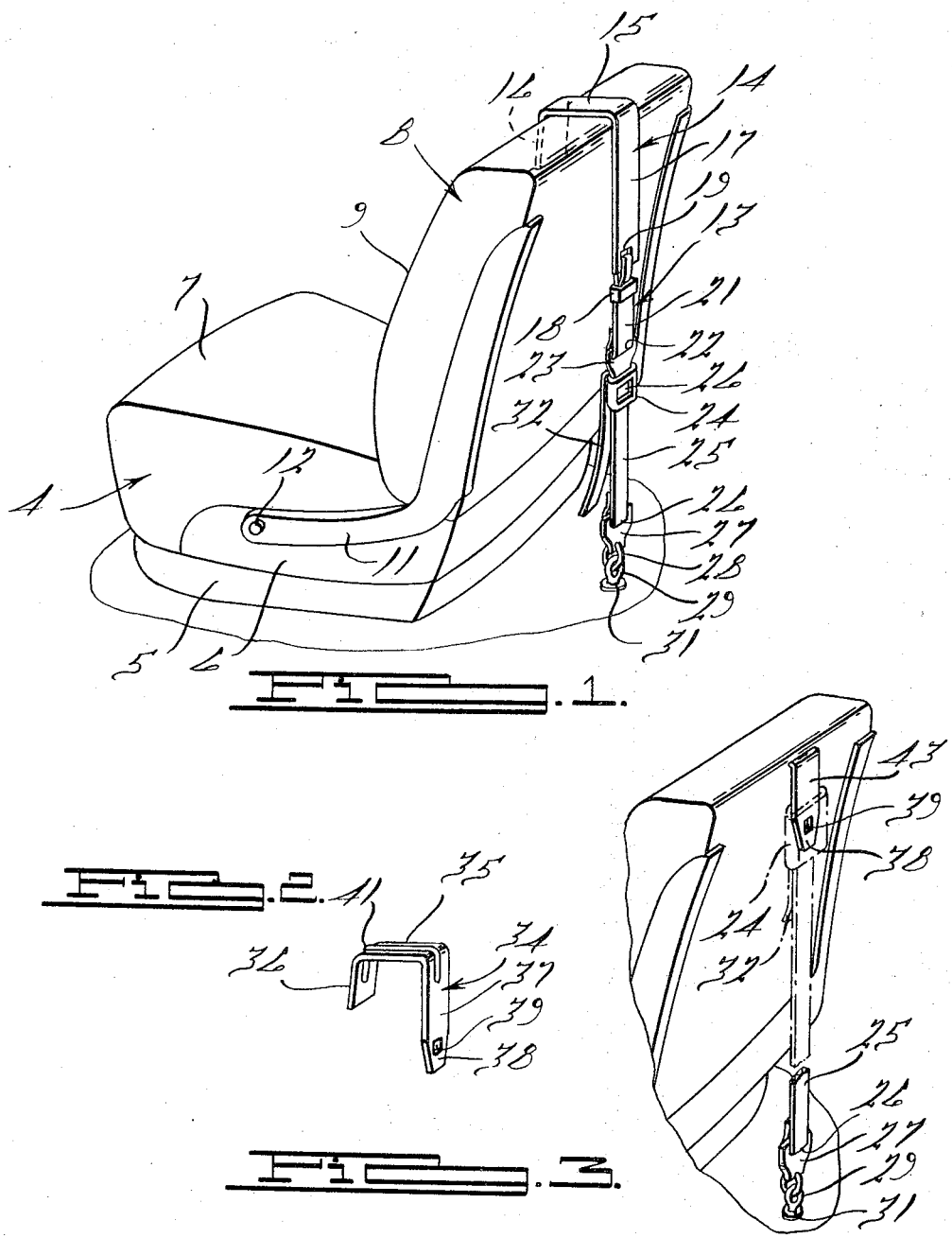
INVENTOR.
Billy H. Burtt
BY
Harness, Dickey & Pierce
ATTORNEYS

United States Patent Office 3,365,231
Patented Jan. 23, 1968

3,365,231
SNUBBING DEVICE FOR A TILTABLE SEAT
Billy Hall Burtt, 11316 Abington,
Detriot, Mich. 48227
Filed Mar. 18, 1966, Ser. No. 535,570
1 Claim. (Cl. 296—65)

ABSTRACT OF THE DISCLOSURE

The invention pertains to a device for preventing the pivoted back of a bucket seat from falling forward upon the rapid deceleration of the automotive vehicle. The device is readily attachable and removable from the seat back and is employed primarily for retaining the seat back in vertical position in the presence of impact. A metal U-shaped element hooks over the top of the seat and a strap arrangement, such as that of a seat belt, secures one leg of the U-shaped element to an anchor in the floor with a predetermined adjustable force. It is only necessary to release the buckle of the seat belt in the normal manner to render the device inoperative and to permit the seat back to tilt forwardly.

---

This invention relates to snubbing devices for a tiltable seat and particularly to a device which will prevent the forward movement of a forward tiltable seat.

Bucket-type seats having tiltable backs are employed in a two-door vehicle, the tiltable back permitting entrance of an occupant to the rear body compartment when the back is tilted forwardly. Such a back is hazardous to a child and particularly to a small child which is placed in an auxiliary seat suspended on a tiltable back of the seat. A sudden stop even at slow speeds may be sufficient to throw the child forwardly with the seat back to cause substantial injury.

The present invention pertains to a back-engaging element which has a releasable buckle in a length of strap which is secured to the vehicle body, preferably to the floor in rear of the tiltable back, and to back-engaging element. The releasable buckle permits the ready assembly of the back-engaging element with the seat back or the disassembly thereof when an occupant desires to enter or leave the rear body compartment. The strap passing through the buckle may be tensioned relative thereto by pulling it further through the buckle after the buckle has been engaged and once properly tensioned no further adjustment will be required.

In the illustrated embodiment of the invention, the back-engaging element is formed from strap material into U-shape providing legs of different lengths, the short length extending over the front of the back cushion and the long leg extending downwardly over the back thereof. One portion of the seat belt is secured to the long leg of the element while the other portion of the seat belt is anchored to an eye-bolt fixed to the floor of the body rearwardly of the seat. The hook-like securing element is placed upon the top of the back and the buckle portion on the strip of webbing thereon is snapped into the mating buckle portion on the section of webbing secured to the floor and after the webbing has been adjusted the back will be firmly secured to the floor. The device prevents the back from moving upwardly and tilting forwardly upon sudden stops, either by the braking of the vehicle or having the vehicle strike an object.

Accordingly, the main objects of the invention are: to provide a securing means for the tiltable back of a seat which prevents it from tilting forwardly when the vehicle is suddenly stopped; to provide an inverted hook-like element which engages the top of the seat back with releasable means which is secured to the floor of the vehicle body rearwardly of the seat; to employ a releasable seat belt having one end secured to the floor and the other end secured to a back-engaging element which is readily attachable and releasable to thereby secure the back against forward tilting movement, and in general, to provide a device for preventing the forward tilting of a seat back which is simple in construction, positive in operation and economcal of manufacture.

Other objects and features of novelty of the invention will be specifically pointed out or will become apparent when referring, for a better understanding of the invention, to the following description taken in conjunction with the accompanying drawing, wherein:

FIGURE 1 is a perspective view of a seat having tiltable back thereon which is secured against tilting by the device of the present invention.

FIG. 2 is a perspective view of the back-engaging element, similar to that of the device illustrated in FIG. 2; and FIG. 3 is a broken view of structure, similar to that illustrated in FIG. 1, showing another form which the invention may assume.

Referring to the figures, an automobile seat 4 is illustrated having a base 5, side plates 6 with a seat cushion 7 disposed therebetween. A back 8 has a front cushion portion 9 supported on arms 11 which are secured to the plates 6 by pivots 12. This permits the back cushion 8 to be pivoted forward onto the seat cushion 7 when ingress or egress is desired by a person to enter or leave the rear body compartment of the vehicle.

For preventing the inadvertent forward tilting of the back seat due to shock or an applied force, the back-securing device 13 of the present invention is utilized. While the device may take various forms, the one herein illustrated is of rigid construction and simple of installation and operation. The device embodies a back-engaging element 14 which is of inverted U-shape having a web 15, a forward leg 16 and a rearward leg 17. The securing element 14 is made of strap material and of sufficient strength to prevent it from bending under when a substantial force is applied to the seat back. It will be noted in FIG. 2 that the leg 16 diverges forwardly from the leg 14 to rest upon the sloping face of the cushion 8 of the seat back.

A clevis 18 is secured in a slot 19 at the end of the leg 17 connected to a strip 21 made of woven fabric or the like. The opposite end of the strip 21 is secured in a slot 22 in an inserting element 23 of a buckle 24, the element and buckle being similar to those employed in a seat belt. The buckle 24 has a strap 25 which passes therethrough and is adjustable relative thereto. The buckle has a button 26 which when pressed, releases insertable element 23 instantly therefrom. The bottom of the strap 25 is secured through a slot 26 in a plate 27 having a ring 28 on the opposite end which is securely anchored in the eye 29 of a bolt 31 which is secured to the floor of the automobile body. The eye is disposed centrally of the seat back and rearwardly of the seat, as clearly illustrated in FIG. 1. The buckle 24, strap 25, plate 27 and ring 28 are placed on the floor in the rear compartment of the body when the device is not in use.

When it is desired to use the device to prevent the forward tilting of the seat back 8, the element 14 is placed upon the back as illustrated in FIG. 1, and the insertable element 23 is forced into the slot in the seat buckle 24 and locked in position. The strap 25 may be adjusted by pulling on the end 32 to produce the proper tension for holding the seat from tilting back and once this adjustment is made no further adjustments will ordinarily be required.

In FIG. 2 a further form of the invention is illustrated that wherein a back-engaging element 34 is illustrated having a web 35, a front leg 36 and a rear leg 37. At the end of the leg 37 a buckle engaging end 38 is provided having an aperture 39 which is engaged by the detent of the buckle 24 on the strap 25. Since the element 34 may be made of thinner material to pass within the slot of the buckle 24 one or more strengthening ribs 41 are provided across the web 35 into the legs extending downward therefrom. With this arrangement the single strap 25 and the means for attaching it to the body along with the buckle 24 is all that is required for securing the back-engaging element in fixed releasable relation to the seat back. By pressing the button 26 the buckle and strap 25 are released so that the element 34 can be removed from the seat back or the seat back can be tilted forward to permit the ingress or egress of an occupant to and from the rear body compartment.

In FIG. 3 a still further form of invention is illustrated that wherein a securing element 43 extends through the upholstery material of the seat back and downwardly from a frame element within the back. This provides a securing element which is a permanent part of the seat back, the element being similar to the leg 37 of the back-engaging element 34 of FIG. 3. The element 43 has an end 38 with an aperture 39 which is engaged by the detent of the belt buckle 24. The belt buckle is supported on the strap 25 which is attached to the floor or other part of the body rearwardly of the seat and will be provided as standard equipment when the securing element 43 is supplied by the manufacturer. It is preferable to have the securing element 43 directly attached to the back seat frame so as to be always available with the buckle 24 and strap 25 to secure the back against tilting. With this arrangement there is no loose element, such as the back-engaging element 14 or 34 which could be misplaced, lost or damaged.

When any one of the securing devices herein illustrated is in use and the rear compartment is to be occupied, it is only necessary to press the button 26 of the buckle 24 to release the device and permit the seat to be tilted forwardly. When within the compartment the seat can be moved back to the position illustrated and locked against accidental forward movement by the insertion of the insertable element 23 within the buckle, as pointed out above. In a similar manner when anyone occupying the rear seat desires to leave the vehicle, the button 26 is pressed to release the device, after which the back is tilted forwardly and upon leaving the compartment the element 23 is inserted within the buckle 26 to lock the back in seating position. The use of the strap, buckle and securing device permits the seat to be adjusted forwardly and rearwardly in the usual manner.

What is claimed is:

1. In a device for securing a pivoted back of a vehicle seat from tilting forwardly under impact, a rigid U-shaped metal securing element having a top web and downwardly extending front and rear legs releasably attachable to the top of the seat back, means providing an anchor to the body of the vehicle rearwardly of the seat, and releasable means connecting said securing element to said anchor means, said releasable means comprising a two part strap, one part fastened to said securing element and the other part fastened to said anchor means, said two parts being joined by a quick release means.

References Cited

UNITED STATES PATENTS

| | | | |
|---|---|---|---|
| 2,559,548 | 7/1951 | Seigneur | 296—65.1 |
| 2,818,274 | 12/1957 | Manos | 297—216 |
| 2,833,343 | 5/1958 | Benson | 297—387 |
| 2,859,048 | 11/1958 | Munn | 280—150 |
| 2,896,999 | 7/1959 | Liubauskas | 296—65.1 |
| 3,289,792 | 12/1966 | Moberg | 280—150 |

LEO FRIAGLIA, *Primary Examiner.*

BENJAMIN HERSH, *Examiner.*

L. D. MORRIS, J. H. BRANNEN, *Assistant Examiners.*